C. WORTHEN.
Thill-Coupling.
No. 223,792. Patented Jan. 20, 1880.
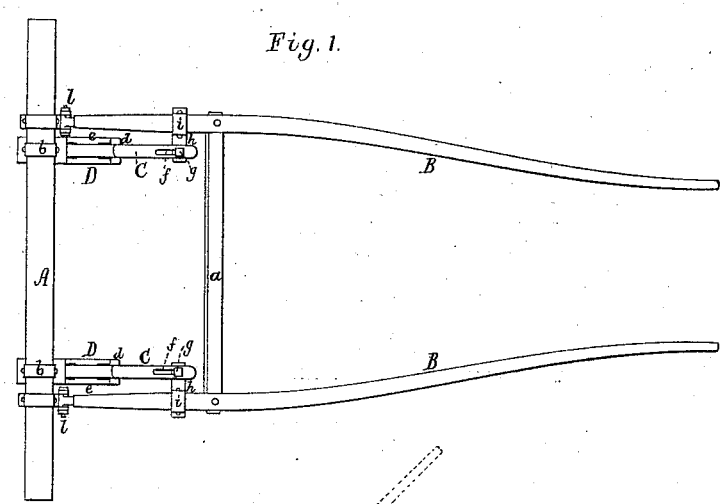
Fig. 1.
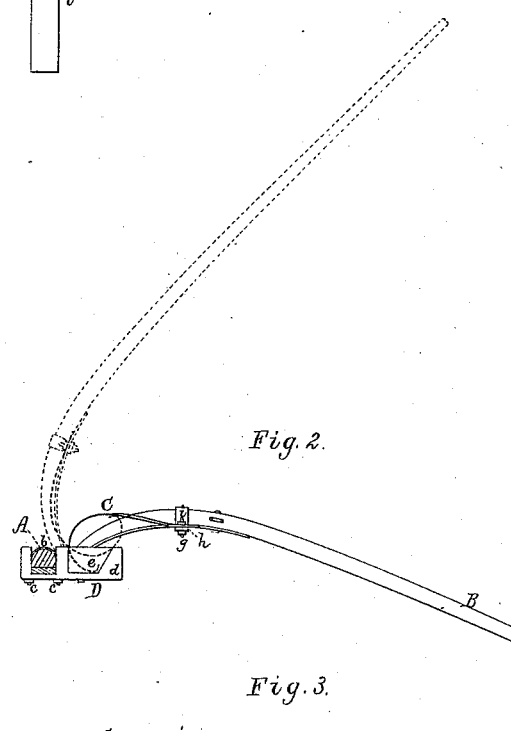
Fig. 2.
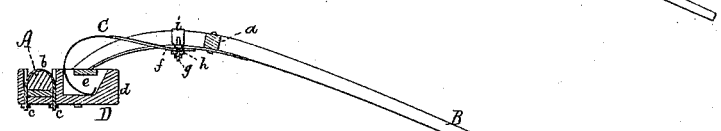
Fig. 3.
Fig. 4.     Fig. 6.
     
Fig. 5.
Fig. 7.
Witnesses
S. N. Piper
W. W. Lunt
Inventor
Charles Worthen
by attorney
R. H. Eddy

UNITED STATES PATENT OFFICE.

CHARLES WORTHEN, OF AMESBURY, MASSACHUSETTS.

THILL-COUPLING.

SPECIFICATION forming part of Letters Patent No. 223,792, dated January 20, 1880.

Application filed November 28, 1879.

*To all whom it may concern:*

Be it known that I, CHARLES WORTHEN, of Amesbury, of the county of Essex and State of Massachusetts, have invented a new and useful Improvement in Wheel-Carriages; and I do hereby declare the same to be described in the following specification, and represented in the accompanying drawings, of which—

Figure 1 is a top view, and Fig. 2 a longitudinal section, of a carriage axle and thills provided with my invention, such figure showing by full lines the thills as down to their lowest position, and by dotted lines as up or at their highest altitude. Fig. 3 is a longitudinal section taken through one of the elastic friction hooks or springs and its bearing or box.

The main object of the devices hereinafter described, on which my improvement rests, is to enable the thills, when "turned up," to be held in position without the necessity of using a prop therefor, as heretofore usually customary. They also act as a safety apparatus in case of either thill becoming accidentally detached from the axle; and, furthermore, they operate to prevent noise or rattling in the joints of the axle and thills.

In carrying out my improvement I combine with the axle and thills one or more elastic friction-hooks and a box or bearing, as hereinafter described, for each of the said hooks to hook to or into and slide or turn in, such box or bearing being fixed to the axle, and such friction-hook being connected at or near its front end to a thill or a projection therefrom.

In the drawings, A denotes the front axle, and B B the thills, of a common buggy or wagon, the cross-bar connecting the thills being shown at *a*.

C C are the hooked friction-springs, and D D the bearings or boxes therefor, these latter being projected from the axle and secured to it by screw-clips *b* and nuts *c*, or by other proper means.

Each of the bearings, as represented, is composed not only of a block or piece, *d*, notched to receive the hook of the spring, but of a cap or saddle, *e*, to enter the notch and extend across the spring, the cap being formed as shown in top view in Fig. 4, in side view in Fig. 5, in end view in Fig. 6, and in longitudinal section in Fig. 7. The said cap is to be held in the notch by screws or other proper devices.

Each of the friction-springs, near its front end, is slotted, as shown at *f*, to receive a screw-bolt, *g*, to fasten it to a bracket or projection, *h*, extending from one of the thills, and secured thereto by nuts and a screw-clip, *i*, or other proper means.

By having the friction-hook slotted, as described, it can be set forward or adjusted to bear with the requisite friction in the box.

On turning the thills either upward or downward the friction-springs will move in the boxes, and when the thills are turned up they will be held up by the said springs and boxes.

One friction-spring and one box therefor might be employed instead of two of such springs and their boxes, as shown; but it is better to have two of the springs, as they serve to hold the thills in connection with the axle in case of accidental loss or breakage of one of the pivotal bolts *l* of the joints of the thills and axle.

In respect to the block D, with which the spring operates, it will be seen that it is composed of a socketed or recessed block, *d*, and the cap *e*, and that the spring in operating passes into and out of the recess of the block and about the upper part of the cap *e*, in consequence of which there is no danger of the spring becoming overstrained or broken. The spring does not pass through one aperture only, but hooks around the part *e*, and consequently requires no head to it (the said spring or extension) from its edges to prevent it from being drawn out of the box D, as is the case with the spring described and shown in United States Patent No. 168,160, wherein the spring is represented as going through a slot in a bearing-plate and against a roller, the spring at its free end being provided with a head.

I claim—

1. The said thill friction mechanism or combination of the elastic friction-hook C and its box or bearing *a* and cap *e*, substantially as set forth.

2. The combination of the elastic hook, slotted as described, with the box or bearing and the bracket and clamp-screw, all being adapted and arranged with, or to be applied to, the axle and thill of a wheel-carriage, as explained.

CHARLES WORTHEN.

Witnesses:
R. H. EDDY,
W. W. LUNT.